US006405261B1

(12) United States Patent
Gaucher

(10) Patent No.: US 6,405,261 B1
(45) Date of Patent: *Jun. 11, 2002

(54) METHOD AND APPARATUS FOR AN AUTOMATIC MULTI-RATE WIRELESS/WIRED COMPUTER NETWORK

(75) Inventor: Brian Paul Gaucher, New Milford, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/704,433

(22) Filed: Nov. 2, 2000

Related U.S. Application Data

(63) Continuation of application No. 08/978,982, filed on Nov. 26, 1997, now Pat. No. 6,175,860.

(51) Int. Cl.[7] .............................................. G06F 15/16
(52) U.S. Cl. ........................ 709/250; 709/227; 709/222; 455/3.06; 340/310.01
(58) Field of Search ............................ 710/11; 709/237, 709/220, 208, 223, 250, 222, 227; 340/10.01, 310.01; 455/3.06

(56) References Cited

U.S. PATENT DOCUMENTS

| 5,086,385 | A | * | 2/1992 | Launey et al. ................ 700/83 |
| 5,432,838 | A | * | 7/1995 | Purchase et al. ............ 455/523 |
| 6,008,777 | A | * | 3/1997 | Yiu ............................. 345/2.1 |
| 5,655,148 | A | * | 8/1997 | Richman et al. .............. 710/8 |
| 5,675,390 | A | * | 10/1997 | Schindler et al. ........... 345/717 |
| 5,682,379 | A | * | 10/1997 | Mahany et al. ............. 370/311 |
| 5,722,041 | A | * | 2/1998 | Freadman .................... 725/82 |
| 5,818,603 | A | * | 10/1998 | Motoyama .................. 358/296 |
| 5,867,730 | A | * | 2/1999 | Leyda ........................ 710/10 |
| 5,910,776 | A | * | 6/1999 | Black .................... 340/825.35 |
| 5,922,055 | A | * | 7/1999 | Shahar et al. ................ 710/16 |
| 5,999,979 | A | * | 12/1999 | Vellanki et al. ............ 709/232 |
| 6,026,150 | A | * | 2/2000 | Frank et al. ............. 379/90.01 |
| 6,098,116 | A | * | 8/2000 | Nixon et al. .................... 710/8 |
| 6,130,917 | A | * | 10/2000 | Monroe ...................... 375/295 |
| 6,195,712 | B1 | * | 2/2001 | Pawlowski et al. .......... 710/19 |
| 6,198,479 | B1 | * | 3/2001 | Humpleman et al. ....... 345/329 |

OTHER PUBLICATIONS

Leeb et al., A configuration tool for HomeNet, IEEE Transactions on Consumer Electronics, vol. 42, Issue 3, Aug. 1996, pp. 387–394.*

Stauffer, Smart enabling system for home automation, IEEE Transactions on Consumer Electronics, vol. 37, Issue 2, May 1991, pp. xxix–xxxv.*

* cited by examiner

Primary Examiner—Glenton B. Burgess
Assistant Examiner—Bradley Edelman
(74) Attorney, Agent, or Firm—F. Chau & Associates, LLP

(57) ABSTRACT

A method and apparatus for implementing a wireless/wired computer network in an indoor environment with inherent reliability is disclosed. A master network box connected to an AC power network and a master computer generates an RF field around the computer, the home, and AC power network. The integration and implementation of additional devices to the established network is made through additional appliance boxes. Once introduced into the generated RF field, or connected to the AC power network, the additional device is automatically and seamlessly registered and configured into the network without requiring any user intervention. The network is capable of multiple modulation schemes for providing robust wired or wireless communication for various devices which have different power and data rates. The programming of the master computer enables the automated registration of additional devices, and can provide superior control over the devices connected to the network, either via the AC power network, or via RF wireless transmission through the multiple modulation schemes.

13 Claims, 4 Drawing Sheets

US 6,405,261 B1

METHOD AND APPARATUS FOR AN AUTOMATIC MULTI-RATE WIRELESS/WIRED COMPUTER NETWORK

CROSS REFERENCE TO RELATED APPLICATION

This application is a Continuation of U.S. application Ser. No. 08/978,982, filed Nov. 26, 1997, now U.S. Pat. No. 6,175,860 B1.

BACKGROUND OF THE INVENTION

1. Field of the Invention

The present invention relates to computer networks. More particularly, it relates to an automatic multi-rate wireless/wired computer network using a combination of wireless communications and an AC power network.

2. Prior Art

The ability to provide cost effective performance solutions for computer networks is consistently being sought by the computer industry. To date, there is not a single device on the market that can handle even the simplest task of wireless control in a broad sense. There are a few single application products that address very specific areas such as wireless mice, or wireless LAN.

The wireless products that have been brought to market are unreliable, and are not as good as a wired product, no matter what their claim. In addition, the automation of these products is not existent. That is, they generally require extensive user intervention to install, configure and get running. In addition, the market has demonstrated that network systems, and additional implementations must be transparent to the user.

Currently, there is not a product on the market that allows the use of the appropriate radio solution (i.e., speed MAC/protocol for a particular need that is flexible enough to cover most other needs as well.) For example, a user does not need a high cost radio and associated elements for low cost type applications (e.g., a mouse), but that is necessary for high-speed LAN access. Thus, there is a need for these different systems to be rolled into one, such that multiple modulation schemes for the varying complexity of devices can be implemented in a single piece of hardware, and whose cost is proportional to the function currently being added.

Historically, there are a limited number of modulations available and systems are typically built around one. Typical modulations used include; AM. And the related QAM FM, and the related FSK, GMSK, MFSK PSK and the related BPSK, QPSK, and M-ary PSK. Within the confines of the FM domain are the related FSK, GMSK, and M-ary FSK. In addition, the PSK modulation family is directly related to FSK via mathematical relation of differentiation or integration for the reverse relation.

Beyond these modulations, there is another family now popularized as Spread Spectrum. These have the properties of robust communications while in harsh electronic environments, such as near other radio systems, or interference such as a microwave oven, etc. They also allow transmission of higher power levels since their output is "spread" over many frequencies. Essentially, there are two spread spectrum modulations, both of which are related to the FM and PSK families discussed earlier. The FM relation is what is called Frequency Hopping (FH), whereby data is mapped into the frequency domain and spread over 80 or more frequencies as illustrated in FIG. 1. The pseudo random mapping is a known sequence to both the transmitter and receiver, therefore the receiver can un-map the hopped frequencies back to the original data sequence. The second family of PSK related modulations is called Direct Sequence Spread Spectrum (DSSS). Here the original data sequence is re-mapped into phase changes rather than frequency changes. These show up in the frequency domain as looking like a Sinc function or sin x/x as shown in FIG. 2.

The FCC imposes certain restrictions on the use of both transmitted power and bandwidth. Power is related directly to the operable distance a device can work over, while bandwidth affects the data rate or speed of communications. One can only push the data rate up until the limit of the FCC bandwidth of a particular band is reached, then additional techniques need to be implemented to go beyond that, such as higher complexity modulations like M-ary PSK, or M-ary FSK or data coding techniques.

Cost sensitivity is also a clear market driven requirement. The cost must be proportional to the function the system provides. A system that can provide simple mouse interface must not cost much more than one would have to pay for the wired equivalent, yet the system must be expandable to higher level of function and speed with proportional cost.

Thus, it is apparent that there is a need for a wireless computer system which includes both protocol and hardware, which is capable of multiple modulation schemes and is simple in setup, operation and cost. The network must be expandable as the user requires, and must be transparent to the user. This means, after software installation, the user does nothing except turn on the components and they do the work of configuration within the wireless environment around a computer and the AC power network. The computer will be able to implement the simplest of tasks such as the wireless mouse and joystick to the more complex task of wireless local area networks.

SUMMARY OF THE INVENTION

It is therefore an object of the present invention to provide an automatic multi-rate wireless/wired computer network that creates both a wired (via AC power line) and a wireless network (via radio) around the computer with which new devices can be seamlessly added, without significant human intervention.

In order to achieve the above object, network boxes and respective protocol are implemented into an indoor environment such as a home or office. According to an embodiment of the invention, an intelligent RF field is created around the computer system and the entire AC power network of the indoor environment. Through the use of radios and the AC power network as both a receiving and transmitting antenna, and the support of several wireless communication protocols, the network system enables the implementation, connection and control of a diverse group of products to the network without requiring user intervention and/or configuration.

To implement the network according to an embodiment of the invention, a master network box is connected between a master computer and the indoor AC power network through connection to an AC outlet. The network box creates the RF field that is the backbone of the network. Additional network boxes, or appliance boxes, are added to other appliances in the indoor environment which enable those appliances to be controlled and operated through the master computer. The appliance boxes include an AC power connection, and can include a data bus (e.g., PCI or USB) for the two way communication of data between the network and the appliance to which it is connected. In an alternative embodiment of the invention, the appliances themselves can be fabricated with the network connection protocol contained therein, and a data bus port contained thereon.

The master network box and the master computer connected thereto are capable of communication on various channels to accommodate communication with a wider variety of additional devices. The communication system implemented by the master network box include MAC (media access channel) protocol, the physical media to transport information, and the modulation method for transmitting over the media. The master network box with master computer supports the following modulation functions: 1) low data rate FSK channel communication; 2) higher data rate 4-level FSK channel communication; and 3) time/data critical spread spectrum communication channels. In addition, the master network box provides the AC power line communications link. These four functions are based on four separate transceivers in the master network box, each occupying a specific number of channels to meet the FCC rules for its band.

In an embodiment of the present invention, the use of multiple modulations in hierarchical form, allows a communications network to be built in elements, beginning with either simple or complex functions, but always with the minimum hardware (i.e, cost and simplest implementation, to accomplish a particular function). Through the use of software programmability, multiple modulation techniques can be employed within a single piece of hardware.

An appliance box is connected between the AC power supply and all appliances in the household to be controlled and implemented into the network. When a new system component is added with the required connection box and is within the confines of the created field, it is automatically found and registered within the system. These components include, but are not limited to, low data rate items such as mice, joysticks, medium data rate items such as keyboards, POTs modems, phones, printers, cameras, and high data rate items such as LANs, disk drives, and printers.

In another embodiment, a PDA device, (e.g., cordless phone or cellular phone) can be used to contact the master computer either through a modem and telephone line connected thereto, or if within the specific range, through the RF field created by the radios and/or the AC power network. The PDA device can enable the user to use voice commands or DTMF commands to control features of the network from remote locations, such as, for example: turning on selected lights; starting an oven to prepare a meal; activating or monitoring security systems, watering the lawn, controlling a VCR to record a particular program; and environmental control over the indoor environment. In other embodiments, the system can include RF ID tags associated with various devices such that when the device enters the RF field emanating from the AC power network, the device is automatically registered in the master computer, and any information relating to that device can be accessed through the master computer. One could envision home inventory done this way.

Each appliance box includes a unique registration identifier for purposes of selectively identifying the connected appliance, and providing the necessary communication protocol to the master computer. This identifier code includes enough information for the master to know what class of device it is, and what communication protocol it prefers. The number sequence of the identifier code classifies it into certain communications categories, such as, but not limited to, single or bi-directional communications, low speed FSK rates, high speed low power FSK, high power spread spectrum communications etc. The registration identifier will include information as to the remote device's ability to back off in data rate, and also includes information as to whether a remote device requires asynchronous or Isochronous communications (i.e., can tolerate delays in the exchange of information or must have essentially continuous service as in the case of voice). Additional coding is used to help the data make it through the channel, such as, for example to provide the master with a way to synchronize itself to the remote device and know whether an error in the received data is made. To allow for synchronization, there is a pre-amble added to the sequence of bits.

The use of the AC power line radiating between 1 and 30 MHZ and picked up by RF system and the reverse link as well, is supported by an embodiment of the present invention. The FCC allows the AC power line communication systems to radiate a certain level of RF field. In addition, the system utilizes this leakage field as part of the communication system.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF PREFERRED EMBODIMENTS

Figure 1:
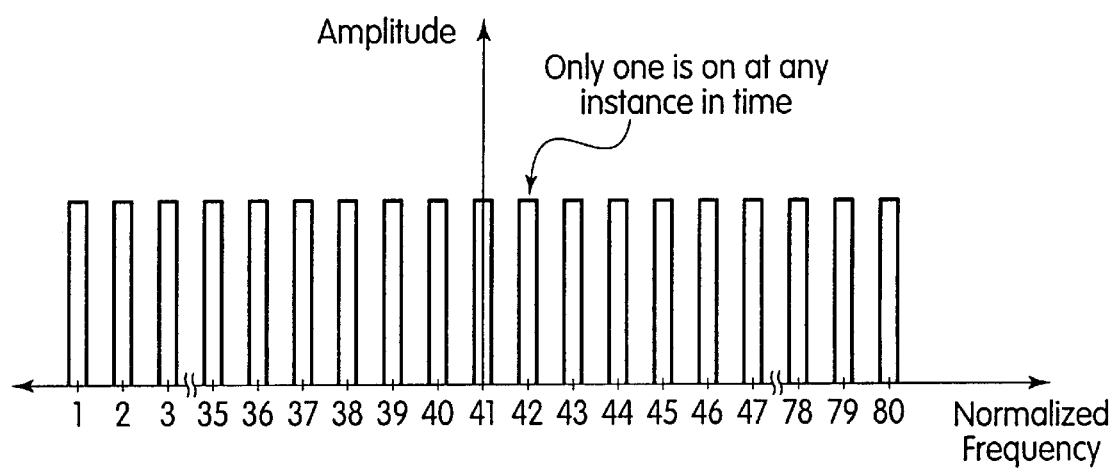
FIG. 1 is a graphical representation of the FM relation called Frequency Hopping (F.)
Figure 2:
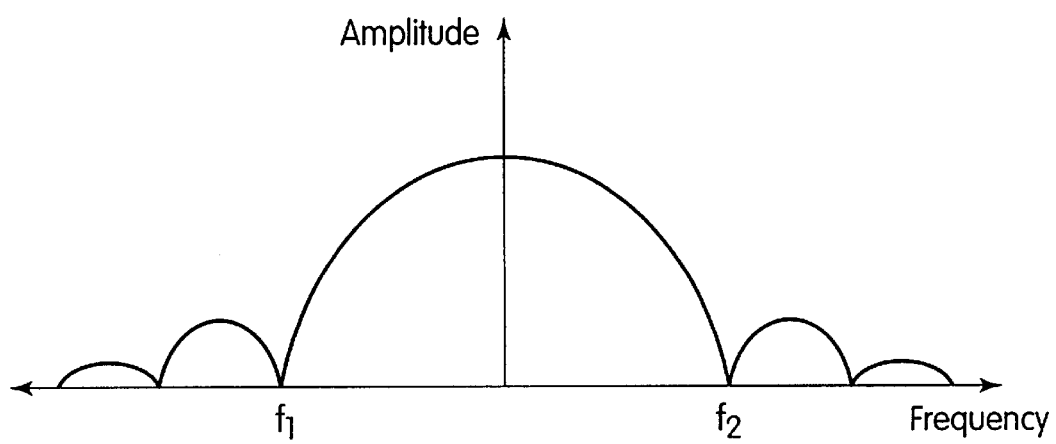
FIG. 2 is a graphical representation of the direct sequence spread spectrum in frequency domain.
Figure 3:
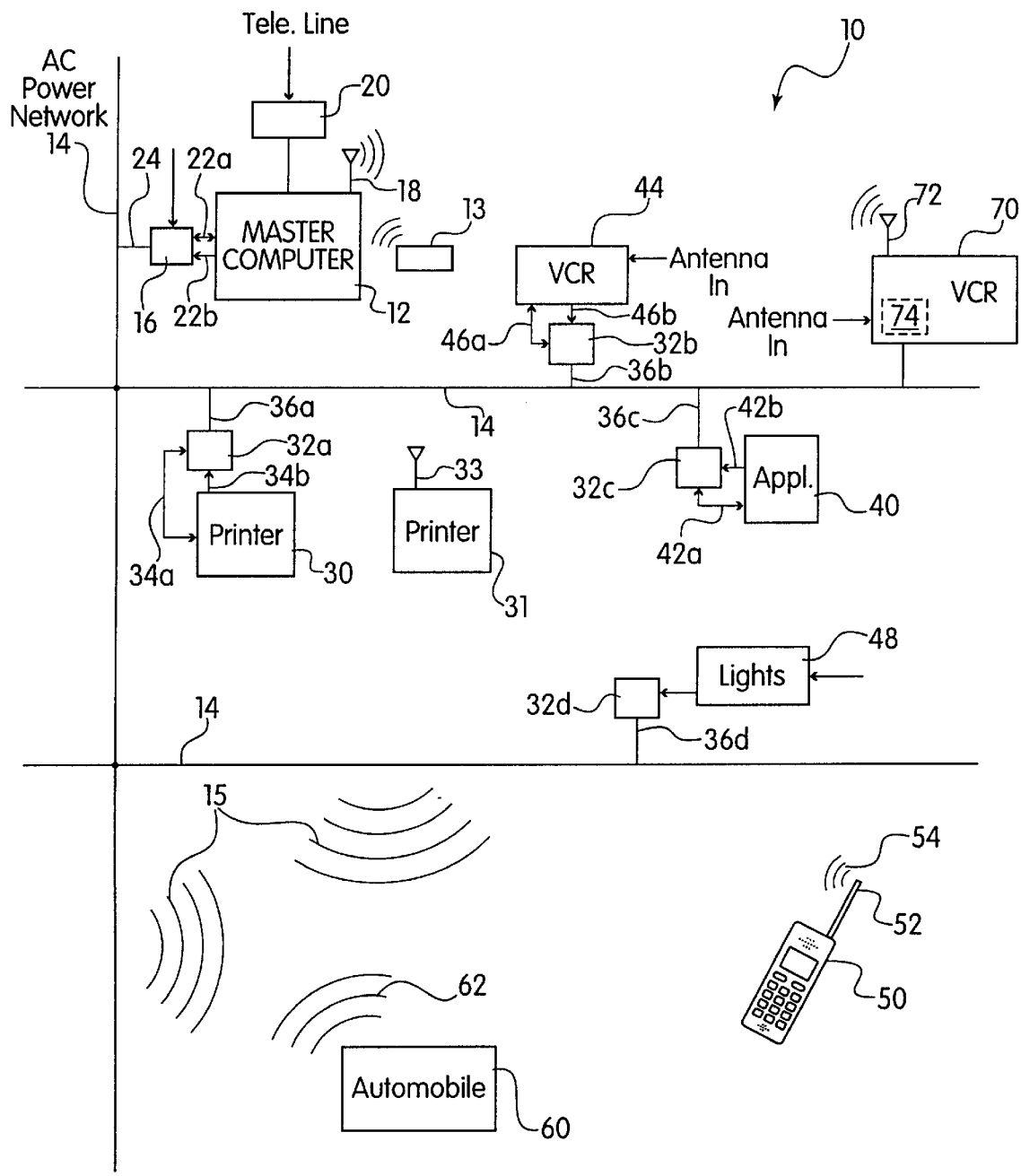
FIG. 3 is a schematic block diagram of the wired/wireless computer network according to an embodiment of the present invention.

Referring to FIG. 3, the multi-rate wireless/wired computer network 10 is shown. The system is implemented on an AC power network 14 which is situated in an indoor environment (e.g., a home or office). A master network box 16 is connected to the AC power network through a standard AC power connection 24. This connection can be a standard AC power cord, or can be any other suitable known type of connection device. Network box 16 is connected to a master computer 12 using AC power connection 22b and a data bus connection 22a. The data bus can be any suitable known type of data bus, such as, for example, a PCI, CEbus, and USB. Computer 12 is connected to a telephone line via a modem 20, and network box 16 is connected to the telephone line through from a household RJ-11 type connector. Network box 16 can be connected to a telephone line with any other suitable known type of connection, for example, it could be hard wired to the telephone line, or connected thereto via another wireless connection.

Computer 12 is programmed with software to enable it to perform according to described invention. The software will be on a CD ROM or floppy disk and is installed when setting up the network. Upon installation, computer 12 is interrogated to determine its operating system, and then prompts the user with questions to configure the network properly. An example of such questions could be "is a phone to be included in the network?". Once installed, a group of relocatable icons are added to the screen. Each device registered on the network is displayed in the icon group and given a number. If a problem occurs with a particular device, a question mark will appear over the icon of that device. When a device is in use, a moving arrow appears over the respective icon to represent operation.

Additional information as to the network operation is always available to the user. For example, a meter that reflects a particular devices utilization of the channel can be included to provide fast reference as to the overall operation of the network and available channels. If all the devices on the network were fully utilized, the meter would be full.

Some of the icons presented to the user will have multiple levels of menus associated with them to control items like speed, priority, and user dependent settings such as, for example, temperature settings in the home. Through the application of these icons, all settings and control of the various devices connected to the network is provided. In addition, the network can control an internal security system and enable the user to selectively activate or deactivate respective parts of the system.

Network box 16 sets up a high-speed (1–10 Mbps) communications network using the AC power network. In addition, network box 16 creates and intelligent RF field 15 around computer 12 and the entire AC power network 14. This network is the backbone of the network communication system, and is capable of transmitting over the air or the home AC wiring.

The system includes additional appliance boxes 32a–32d for connecting different types of appliances to the network. Each appliance box includes a unique registration identifier for purposes of selectively identifying the connected appliance, and providing the necessary communication protocol to master computer 12. In addition, the appliance boxes that are capable of two way or bi-directional communication, include a data port for communicating over a data bus. Appliance box 32a is connected to the AC power network 14 via a two-way communication connection 36a, and connected to a printer 30 using a data bus connection 34a and an AC power connection 34b. In this configuration, master computer 12 can utilize printer 30 by sending the respective data via the created network. In an alternative embodiment, printer 31 includes the network connection protocol internally, and can be automatically registered into the network through the RF field 15 via antenna 33. Additional appliances can be connected anywhere in the AC power network using appliance boxes. For example, an appliance 40 can be connected to the AC power network via appliance box 32c. The appliance 40 can be any household or office appliance, and is connected to box 32c through an AC power connection 42b and a data bus connection 42a. Similarly, a VCR 44 or lights 48 can be connected to the network using the respective appliance boxes 32b or 32d.

Once connected to the network, VCR 44, appliance 40, and lights 48 can be selectively controlled through master computer 12.

As mentioned earlier with respect to printer 31, it is envisioned that the appliance box hardware and connection protocol be implemented into the appliances themselves. For example, a VCR 70 can contain the hardware and communication protocol 74 required for network integration. Thus, once VCR 70 is plugged into an AC power outlet in the network, it may transmit its registration identifier to master computer 12. VCR 70 may also include an antenna 72 for enabling RF integration into the network. Thus, it is apparent that this feature would lend itself to easier installation, and require less user intervention for setup and configuration.

With the RF network established by network box 16, an RF field 15 is generated around the home by virtue of the AC power network 14 and radios, both in and outside of indoor environment. Through the application of this field, once a device comes into the confines of field 15, it can be automatically registered into the network, and any integral information relating to the device can be transferred to master computer 12, and acted upon accordingly. This is due to the fact that master computer 12 constantly monitors the entire network, including the RF field 15. For example, when an automobile 60 drives into the garage or within the confines of field 15, master computer 12 recognizes the automobile and can download information such as, for example, the number of miles traveled since your last oil change. In addition, the automobile's existing sensors can be used to provide master computer 12 with other diagnostic information, such as, for example, scheduled maintenance, brake wear, daily mileage, business mileage, gasoline fill-ups, etc. This network communication, can further enable a user to program a future trip in the master computer, and have that data transferred to the automobile's GPS system. The GPS system can then be automatically programmed accordingly. Once any data is stored in master computer 12, it can be transferred to another computer (e.g., office computer), or can be simply stored for further reference or processing.

Additionally, system 10 includes at least one PDA device 50 for enabling the control of the networked indoor environment from a remote location. PDA can be any suitable known PDA device, and can include, for example, a cordless or cellular telephone. If PDA 50 is within the confines of RF field 15, it can be automatically registered into the network, and any input commands will be acted upon accordingly. If, PDA 50 is not within the confines of RF field 15, the user can contact master computer 12 through the telephone line, via modem 20. Once connected, the user can verbally instruct the master computer to perform various functions, such as, for example, scheduling functions of the user, or simple control functions such as "turn on lights", "activate the oven", "activate the dishwasher or laundry machine" etc.

As mentioned, the PDA can be used for scheduling functions. For example, one speaks into the PDA requesting to schedule an event and the system recognizes that vocabulary and updates your calendar with the time and tagged voice message that can be converted to text in the master computer 12. Offline, the system can call your office and update your office calendar automatically. The PDA can also act as a homing device letting the master computer 12 know where you are within the generated radio or AC power network RF field 15, and can route information directly to the user. The homing aspect can enable the master computer to turn on and off lights as you enter and leave rooms, respectively without the need for human intervention. Once the PDA 50 is turned off, or outside the range of the RF field 15, it automatically enters a sleep mode, or returns to its cellular function if so enabled.

The PDA can make and receive telephone calls routed through the master computer 12. The calls can be logged and screened using caller ID. The PDA can be loaded with e-mail messages currently waiting to be read, and the user can selectively read any, all or none of the waiting messages. The PDA could even voice synthesize those messages, and play them over the PDA while the user goes about their ordinary business in the home. This feature also extends to voice mail and other messaging systems.

Future generations of the PDA might include the ability to receive and send video information. For example, one may be able to take a simple snap shot of a document and have it transferred to the master computer 12 for character recognition, etc. It could also be used to take snap shots of people, feed business cards into the system, and can be used for building entry/security, address book updating, etc.

With the implementation of this system, additional services can be provided to the user for controlling appliances within their home or other indoor environment. For example, Internet services can be purchased whereby the service provider can automatically program VCR 44 to record selections the user would select from a menu.

Communication Protocol

As explained earlier, through the use of software programmability, multiple modulation techniques can be employed by a single piece of hardware. This process can go in either of two directions: 1) utilizing the programmability, only making software appropriate for each class of devices, but the same IC, modified only by memory required; or 2) by optimizing the actual die or chip size for each class of devices. Using a single device and modifying code only makes the device proliferate faster, but at a slightly greater cost for the low function class of devices. Since volumes drive cost, the more one can cause a device to proliferate the lower the potential cost. In the case of 2), this system optimizes the complexity (i.e., implementation difficulty), actual Si (silicon) or SiGe (Silicon Germanium) are (hardware cost) with the functional capabilities required. For example, a mouse function requires minimal data rate, yet in accordance with the present invention, the same controller/processor as used for higher speed and complexity in a device like the wireless LAN, is used for the mouse. This is done by taking advantage of Si and SiGe design tools at the device level, where function macros can be developed that result in specific function IC's. This allows a designer to create blocks that can be used as primitives and added to later for additional functionality. The designer can now create Si or SiGe macros with simple functions that use only a small amount of Si. More complex functions would be built using that same primitive added to additional Si macros to complete the higher level function.

Figure 4:
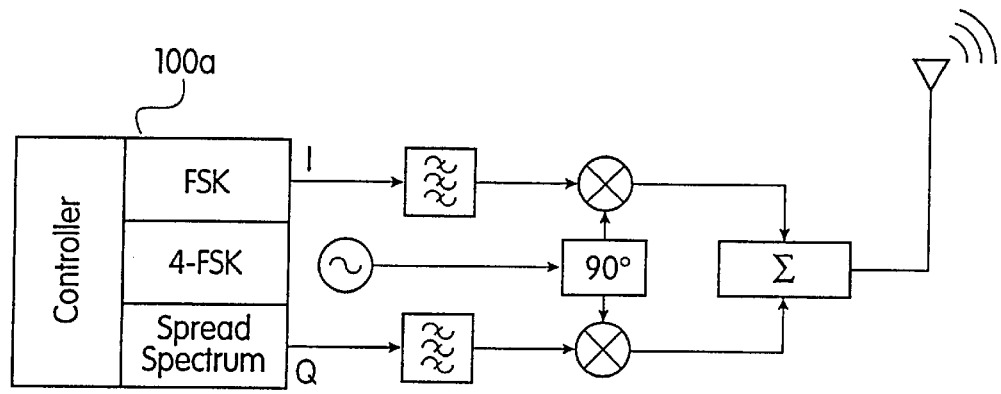
FIG. 4 is a block diagram of a multi-modulation transmitter according to an embodiment of the present invention.
Figure 5:
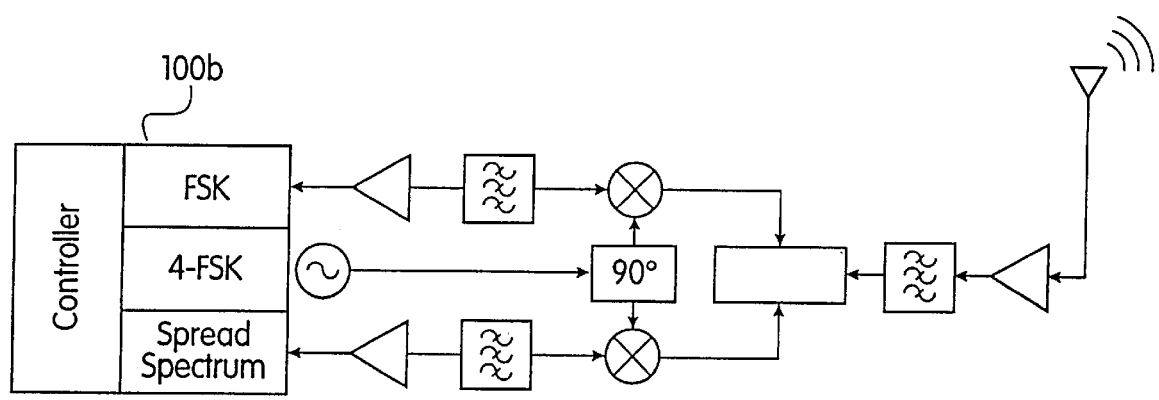
FIG. 5 is a block diagram of a multi-modulation receiver (demodulator) according to an embodiment of the invention.

FIGS. 4 and 5 show the implementation of the transmitter and receiver portions of an exemplary communication system according to an embodiment of the network box 16 and the more complex of the appliance boxes. FIG. 4 shows the modulator or transmitter portion, and FIG. 5 shows the de-modulator or receiver portion. As shown, both the transmitter and receiver include a controller 100a and 100b, respectively, which enable three different modulation schemes to operate depending on the type of device and complexity of functions being performed. The highest-level complexity transmitter (FIG. 4) is capable of the simplest FSK to the most complex Spread Spectrum modulations. The basic RF hardware involved is made up of I (in-phase) and Q (quadrature Phase) modulators. In actual implementation, for example, the wireless mouse would make use of the FSK level of communications and not anything beyond that, and therefore would not require additional Si area.

The lowest cost example is the first "primitive" which is FSK modulation. The lowest cost system on the market is FSK or BFSK, very similar to FM, therefore, all radios in this proposed network will be capable of communicating using this most basic form of modulation. For example, functions like wireless mouse, joystick, and keyboards will utilize this scheme. These are typically low data rate devices not requiring more than 10's to 100's kbps in data transmission. Next in the hierarchy of data requirements would be those devices requiring more than 100's kbps. For those devices exceeding 1 Mbps, a 4 level FSK scheme is proposed. This can still meet the requirements of the FCC bandwidth, but yet go as high as 2–4 Mbps. For those systems requiring long distance operation like telephony and remote networking, it is proposed to implement spread spectrum. The simple FSK modulation includes the class of FSK called frequency chirp FSK that provides for very robust radio communications. As described earlier, for the lower data rates it would be frequency hopping while for the higher data rates it would be direct sequence.

Network Setup/Implementation

The master computer 12 serves four major functions: it services the low data rate FSK channel; it services the higher data rate 4-level channels and the time/data critical spread spectrum channels, and finally the AC power line communications link. These four functions are based on three separate RF transceivers and the AC power line transceiver in the Master network box 16, each occupying a specific number of channels to meet the FCC rules for its band. The controller 100 in the master is the heart of the system, distributing data and control throughout the network, allowing communications from the PSTN to Peer, Peer to Peer, Peer to AC power line, AC power line to PSTN, and of course, master to any device connected to the network.

The network setup begins by starting with the assumption that the master network box 16, at master computer 12, is turned on. Once on, network box 16 constantly scans the channels in the FSK mode looking for new or unregistered devices, as well as attempting to service those already registered. If it finds a new unregistered device requesting service, that means the device has been turned on within the field area 15 of master computer 12 and AC power network 14, and is periodically requesting service. When the master detects a device communicating on this lowest of protocols (i.e., FSK mode), it queries the device asking what it is and its preferred communications mode, similar to that of telephony modems, except the communication starts at the lowest level and works upward. The device responds to the master providing it's unique registration and serial number, coded in ROM or switches set at the factory. This code includes enough information for the master to know what class of device it is, and what communication protocol it prefers. In the case of a wireless mouse, e.g., mouse 13 (see FIG. 3), where single direction communications is acceptable (i.e., the mouse has no receiver), and the code it transmits at power up and part of every packet, is enough for the master to realize it cannot send out information to the device, but can only receive it. It therefore establishes communications on the channel it was queried on and remains there until the mouse changes frequency, upon which time the process begins again. There can also be a more intelligent mouse that has bi-directional communications capability, which would be recognized by the master who would then take advantage of this fact with more error checking, etc.

As mentioned earlier, each device to be connected to the network has a unique identifier, whose number sequence classifies it into certain communications categories, but not limited to; single or bi-directional communications, low speed FSK rates, high speed low power FSK, high power spread spectrum communications etc. As described earlier, the single direction devices will periodically broadcast its registration number to the master on a prescribed channel beginning at turn-on. The master filters off all data packets after the registration number and discards them until it has been registered. Once registered, the packets will then be acted upon, such as packets indicating mouse movement etc.

For those devices that are bi-directional, they will remain idle at turn-on, though constantly listening on a beacon channel for information from the master. When a device hears the master for the first time, it waits a random amount of time and then transmits its identifier to the master which will then register the device and service its request periodically at its preferred data rate and modulation, channel allocation, and at a defined power level that is the minimum for robust operation for that device.

This implies that power control is done for each bi-directional device to minimize the impact of this system with any existing system in a home or business such as cordless phones, etc. The power control consists mainly of two points: 1) the ability of the master to measure the signal level of a remote device, typically call RSSI (Received Signal Strength Indicator); and 2) the ability to measure the quality of the signal as measured in error packets, typically Bit or Packer Error rates (BER). Based on a combination of these two, the master computer 12 will computer and request an increase or decrease in power from the remote device. If capable, the remote device will send comparable signal quality information to the master, which will adjust its level up or down accordingly. The update of change is based on an integral measurement, essentially an average over time to keep the power control loop stable. The amount of adjustment will be in steps of roughly 5 dB from a low power of −20 dBm to a high if +20 dBm, at net 40 dB control range. (Not all devices will have this capability or dynamic range).

Registration

The registration process is cyclic in that the master is periodically checking the FSK link for new members as it goes about the process of servicing other devices. After registration is complete, the master continues to service the remote devices at their preferred rate and modulation. If the master detects an error rate too high for a particular device, it can communicate to the device a code that will tell it to reduce the data rate in steps of 3 dB or factors of 2. Not all devices are capable of this level of intelligence, but those that are will respond in an attempt to reduce the overall error rate and increase throughput. The registration identifier will include information as to the remote device's ability to back off in data rate.

The registration identifier also includes information as to whether a remote device requires asynchronous or Isochronous communications (i.e., can tolerate delays in the exchange of information or must have essentially continuous service as in the case of voice). As the number of Isochronous devices (voice channels) goes up, the throughput of the other devices begins to drop. The master will automatically adjust the asynchronous devices downward to accommodate the Isochronous devices. This process will continue until the bandwidth of the channel is exhausted and then no new devices will be accepted into the network, until the requirements of Isochronous devices drop. Then the master will redistribute the bandwidth to the registered devices according to the priority and class device their registration identifier indicates, and then begin accepting new devices if presented.

Another important aspect of registration includes coding that is used to help the data make it through the channel. The registration identifier is coded in such a way as to provide the master with a way to synchronize itself to the remote device and know whether an error in the received data is made. To allow for synchronization, there is a pre-amble to the sequence of bits. Synchronization takes two forms: carrier and data. In the case of spread spectrum modulation, there is an additional step of chip level synchronization. For example, a 511 Barker code could be used for the master to synchronize to. For the most complex of examples in this system, (i.e., a spread spectrum device), the sequence may be carrier synch, PN synch and bit synch. At this point, the master can read the data given to it, but the possibility of errors occurring still exists. To combat that, an FEC code (Forward Error Correction) may be included. These usually take the form of cyclic codes, well defined in the art. This allows the master and remote devices to communicate in a very robust and reliable manner, correcting most errors as they occur or requesting re-sends of packets that are uncorrectable. This level or robustness is reserved for the upper tier devices and not practical for the low cost, low data rate devices like mice or joysticks. For these lower tier devices, there may be no error checking or just minor error coding such as multiple sends of the same command within a specified time boundary that master computer 12 can interpret. They may be simple cyclic redundancy checks (CRCs) on the next upper tier. In any case, master computer 12 can handle any and all of these while the remote devices are limited to communicating at or below their class.

The remote devices are first designed to work with a master, but if none can be found (i.e., no interrogation was initiated by a master), it can become a simplified master to establish a peer to peer link. For example, a laptop computer equipped with this system could establish a link with a like system by simulating the desired protocol. The registration process would be similar, though limited to its class of device or lower.

MAC/protocol

There are numerous ways a wireless network can access the channel or RF media and they include transmitting at the instance of request, listening before transmitting to avoid collisions with other devices (CSMA-CA), and reserving time slots for communication (slotted Aloha/TDMA) etc. The system of the present invention is a combination of techniques, time division duplex (TDD), CSMA-CA, Frequency Division Multiple Access (FDMA), and Time Division Multiple Access (TDMA). At turn on, each device operates in an FSK mode listening and alternating transmission on a prescribed channel in a pseudo random time division scheme with random back off. This is the registration channel. Once registered, units move to new frequency locations and power levels they are designed to operate at. For some this will mean following a pre-set time schedule of transmissions coordinated by master computer 12. For others, a coordinated selection of frequencies chosen by the master computer and allocated on a time division basis to all the remotes in that class.

Figure 6A:
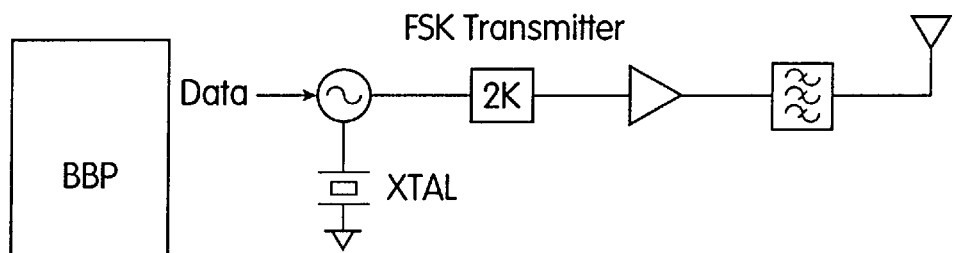
FIG. 6a is a block diagram of a first class of appliance network connection box according to an embodiment of the present invention.
Figure 6B:
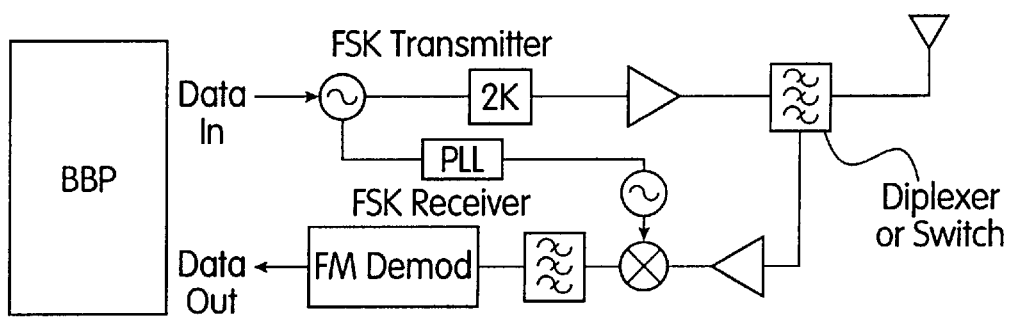
FIG. 6b is a block diagram of a second class of appliance network connection box according to an embodiment of the present invention.
Figure 6C:
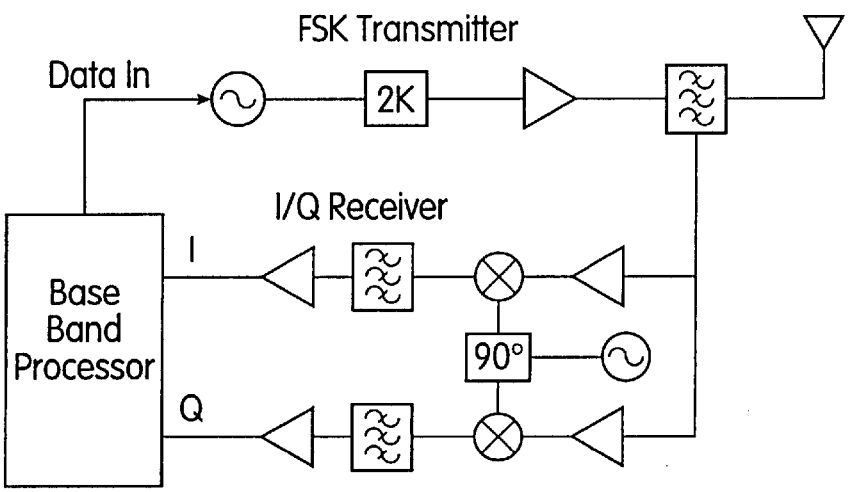
FIG. 6c is a block diagram of a third class of appliance network connection box according to an embodiment of the present invention.

The RF Hardware is a combination of two main classes of devices relating to modulation complexity and directionality. The first class is single direction simple FSK devices that require the minimum hardware configuration, only a transmitter with a single modulator (FIG. 6a). The second class of device is the bi-directional FSK line that requires both a transmitter and receiver, though still a single modulator and demodulator (FIG. 6b). The last class device is the bi-directional multi-level FSK or spread spectrum transceivers that require dual modulators and demodulators for the I and Q channels (FIG. 6c). The actual Si hardware choice can be just to utilize parts of a single common IC like shown in FIG. 6c, or to use an IC of minimum design (FIGS. 6a and 6b) and save the money saved in Si area. This is an economic choice not technical, and can be made at the time of production, with some estimation of anticipated volumes.

It should be understood that the present invention is not limited to the particular embodiment disclosed herein as the best mode contemplated for carrying out the present invention, but rather that the present invention is not limited to the specific embodiments described in this specification except as defined in the appended claims.

I claim:

1. An apparatus for establishing an automatic multi-rate wireless/wired computer network comprising:
    a master processing unit;
    an AC power network coupled to said master processing unit;
    an RF field generator configured to generate an RF field around the master processing unit and the AC power network to envelope a location in the RF field;
    a plurality of different devices connected to said AC power network, the plurality of different devices including wired or wireless devices; and
    a scanner adapted to scan the RF field to identify and register new devices entering the RF field to establish communication with the new devices and add the new devices to the plurality of different devices, wherein the RF field generator further comprises a master network box having a first connection port connected to the AC power network, a second connection port for providing AC power to the master processing unit, and a third data connection port for connecting to a data bus of the master processing unit.

2. The apparatus as recited in claim 1, further comprising:
    at least one appliance network box connected between at least one of the plurality of different devices and the AC power network, the at least one appliance box having a unique registration identifier; and
    a register adapted to register new registration identifiers identified through the scanner.

3. The apparatus as recited in claim 2, wherein the scanner includes communication channels to establish communication with the plurality of different devices, the communication channels having multiple available modulation schemes.

4. The apparatus as recited in claim 1, wherein the scanner selects a modulation scheme depending on a preferred data rate of each of the plurality of different devices.

5. The apparatus as recited in claim 1, wherein the plurality of different devices include at least one of a VCR, a light, a telephone, an appliance, an automobile, a wireless communications device, a mouse, a camera, a keyboard, a security system and a printer.

6. The apparatus as recited in claim 1, wherein the master processing unit operates and controls the plurality of different devices.

7. An apparatus for establishing an automatic multi-rate wireless/wired computer network comprising:
    a computer system including a memory storage device and an operating system, the computer system including a scanner adapted to identify any registration identifiers not registered in the network; and a register adapted to register new registration identifiers identified by the scanner;
    an AC power network coupled to the computer system;
    a network box coupled to the computer system and the AC network, the network box adapted to generate an RF field around the computer and the AC power network to envelope a location in the RF field;
    a plurality of different devices coupled to the RF field such that signals are transmitted to and received through the RF field, the plurality of different devices including wired or wireless devices; and
    a communicator adapted to establish communication between the computer system and the plurality of different devices, further comprising an appliance network box adapted to provide an RF interface for communicating between the computer system and at least one of the plurality of different devices and wherein the appliance network box is connected between a device of the plurality of different devices and the AC power network, the appliance box having a unique registration identifier for identifying the device of the plurality of different devices.

8. The apparatus as recited in claim 7, wherein the communicator includes a plurality of protocols adapted to communicate with the plurality of different devices in accordance with a preferred protocol for a particular device.

9. The apparatus as recited in claim 8, wherein the plurality of protocols include a plurality of modulation schemes.

10. The apparatus as recited in claim 9, wherein the plurality of modulation schemes include at least one of FSK, 4-level FSK and Spread Spectrum.

11. The apparatus as recited in claim 8, wherein one of the plurality of protocols selects a modulation scheme depending on the preferred data rate of each of the plurality of different devices.

12. The apparatus as recited in claim 7, wherein the plurality of different devices include at least one of a VCR, a light, a telephone, an appliance, an automobile, a wireless communications device, a mouse, a camera, a keyboard, a security system and a printer.

13. The apparatus as recited in claim 7, wherein the computer system operates and controls the plurality of different devices.

* * * * *